United States Patent
Kranzley et al.

(10) Patent No.: US 7,058,611 B2
(45) Date of Patent: Jun. 6, 2006

(54) METHOD AND SYSTEM FOR CONDUCTING SECURE ELECTRONIC COMMERCE TRANSACTIONS WITH AUTHORIZATION REQUEST DATA LOOP-BACK

(75) Inventors: Arthur D. Kranzley, Pound Ridge, NY (US); Stephen W. Orfei, Katonah, NY (US); Bruce J. Rutherford, Stamford, CT (US); John Wankmueller, New Hyde Park, NY (US)

(73) Assignee: MasterCard International Incorporated, Purchase, NY (US)

( * ) Notice: Subject to any disclaimer, the term of this patent is extended or adjusted under 35 U.S.C. 154(b) by 382 days.

(21) Appl. No.: 09/902,359

(22) Filed: Jul. 10, 2001

(65) Prior Publication Data

US 2002/0128973 A1   Sep. 12, 2002

Related U.S. Application Data

(60) Provisional application No. 60/217,132, filed on Jul. 10, 2000.

(51) Int. Cl.
 *H04L 9/00* (2006.01)
 *G06F 12/14* (2006.01)

(52) U.S. Cl. ............... 705/64; 705/67; 705/1; 705/26; 705/35; 705/39; 705/40; 705/44; 713/156; 713/150; 713/152; 713/200; 718/152; 718/156

(58) Field of Classification Search ............... 705/78, 705/64, 67
 See application file for complete search history.

(56) References Cited

U.S. PATENT DOCUMENTS 5,724,424 A * 3/1998 Gifford ................. 705/79
5,761,306 A   6/1998 Lewis ..................... 380/21
5,790,677 A * 8/1998 Fox et al. ................ 705/78
5,883,810 A   3/1999 Franklin et al. ....... 364/479.02
5,996,076 A * 11/1999 Rowney et al. ......... 713/201
6,078,902 A * 6/2000 Schenkler ............... 705/35
6,226,752 B1 * 5/2001 Gupta et al. ............ 726/9
6,227,447 B1   5/2001 Campisano ............ 235/380
6,247,129 B1 * 6/2001 Keathley et al. ......... 713/156
6,327,578 B1 * 12/2001 Linehan .................. 705/65

OTHER PUBLICATIONS

SET Specifications, Book 1, Business Description, May 31, 1997.
SET Specifications, Book 2, Programmer's Guide, May 31, 1997.
SET Specifications, Book 3, Formal Protocol Definition, May 31, 1997.
SET Specifications, May 31, 1997 Book 1, Business.
SET Specifications, May 31, 1997 Book II Program.
SET Specifications, May 31, 1997 Book III, Form.

* cited by examiner

*Primary Examiner*—Firmin Backer
*Assistant Examiner*—Daniel L. Greene
(74) *Attorney, Agent, or Firm*—Baker Botts L.L.P.

(57) ABSTRACT

In accordance with the present invention, when an appropriate transaction message is received by a payment gateway, instead of requesting an authorization of the transaction through the payment network, the payment gateway instead sends an authorization response back to the message originator. The payment gateway may perform authentication functions and send transaction data back to the message originator. In this way, the payment gateway may be used for authentication functions while the message originator may use its existing payment system protocols to conduct authorization functions.

5 Claims, 2 Drawing Sheets

METHOD AND SYSTEM FOR CONDUCTING SECURE ELECTRONIC COMMERCE TRANSACTIONS WITH AUTHORIZATION REQUEST DATA LOOP-BACK

PRIORITY APPLICATIONS

This application claims priority to U.S. provisional application No. 60/217,132 filed on Jul. 10, 2000, and entitled "Method and System for Conducting Secure Electronic Commerce Transactions With Authorization Request Data Loop-Back," which is hereby incorporated by reference.

BACKGROUND

The present invention is directed to a system and method for conducting secure electronic commerce (e-commerce) transactions and, more particularly, to a system and method for conducting e-commerce transactions utilizing a payment gateway that is able to communicate with a payment network for the authorization of the transactions.

By way of further background, many methods of conducting secure electronic commerce transactions are known in the art. One of these methods includes the SET™ protocol, which is managed by SET Secure Electronic Transaction LLC ("SETCo"), and which is part of an open technical standard for the commerce industry developed by Visa International Service Association and MasterCard International Incorporated as a way to facilitate secure payment card transactions over the Internet. Using the SET protocol (or specification), cryptography is utilized to ensure confidential and secure transmissions of data and digital certificates to create a trust chain throughout the transaction, verifying cardholder and merchant validity. There have been numerous extensions and additions to the SET specification, all of which are presently available on SETCo's website, setco.org. The SET protocol ("SET") is typically invoked after a consumer has completed the payment and other information on an order form and is ready to return the order form to the merchant.

SET changes the way that participants in a payment system interact. In a face-to-face retail transaction or a mail order transaction, electronic processing begins with the merchant or the acquirer. However, in a SET transaction, the electronic processing begins with the cardholder.

In the electronic commerce environment, consumers and corporate purchasers generally interact with merchants from personal computers. A cardholder (or account holder—a physical card is not necessary) uses a payment account number or card that has been issued by an issuer. SET ensures that the cardholder's interactions with the merchant, and specifically the payment card account information, remains confidential. The typical participants, entities or components (in addition to the account holder) involved in a SET transaction are the issuer, the merchant, the acquirer and payment gateway, each of which can be described as follows:

An issuer is a financial institution that establishes an account for a cardholder and most often issues the payment card. The issuer guarantees payment for authorized transactions using the payment card in accordance with payment card brand regulations and local legislation.

A merchant offers goods for sale or provides services in exchange for payment. With SET, the merchant can offer its cardholders secure electronic interactions. A merchant that accepts payment cards must have a relationship with an acquirer, which is the financial institution that establishes an account with a merchant and processes payment card authorizations and payments.

Lastly, a payment gateway is a device operated by an acquirer or a designated third party that processes merchant payment messages, including payment instructions from cardholders.

As mentioned above, SET is an Internet transaction protocol which provides security through authentication. It enforces a series of checks and counterchecks between the participants' computers to ensure details are processed correctly, safely and securely. In this way, SET creates a trust framework around the electronic commerce transaction process, ensuring confidentiality, data integrity and authentication of each party:

Confidentiality

SET protects the privacy of the payment information that consumers transmit over the Internet by keeping all details encoded throughout a payment transaction. This contrasts with other Internet shopping systems, where payment card details are often sent over open networks with few, if any, security precautions, and are stored by the retailer in open databases, making payment information susceptible to unauthorized access. As consumers' account details provide data which hackers could use to create counterfeit cards and fraudulent transactions, this lack of security is a major concern. By using SET, consumers and merchants are protected—its design ensures that payment information is safe and can only be accessed by the intended recipient.

Data Integrity

With SET, the merchant can be assured that the order it receives is what the cardholder entered. SET combats the risk of transaction information being altered in transit by keeping information securely encrypted at all times and by using digital certificates to verify the identity of those accessing payment details.

Authentication

The anonymity of Internet shopping means that cardholders cannot know for sure which merchant they are dealing with or whether that merchant is properly authorized to handle payment card transactions. Similarly, merchants have no way of verifying whether the cardholder is in possession of a valid payment card or has the authority to be using that card. SET addresses these concerns by using digital signatures and digital certificates to authenticate the banking relationships of cardholders and merchants. This creates an authentication system similar to a consumer signing a payment card slip in a face-to-face transaction. With SET, no matter what the location of a consumer or a merchant, both parties can be confident of each other's legitimacy.

As described, SET uses encryption technology and digital certificates as the basis for electronic commerce transactions. There are several components required for SET to work:

1. Digital Certificates

Digital certificates are an important element in securing SET transactions. They are authenticated by digital signatures, validating the identities of the participants. Each transaction participant's certificate holds information that is unique to them and is verified by the trusted source:

To become SET enabled, a financial institution must first establish a Certificate Authority, which allows it to issue certificates to its cardholders and merchant customers.

Merchants obtain SET digital certificates from their acquirer bank. The merchant's certificate authenticates its identity.

Consumers are provided with digital certificates by their payment card issuers, just as they are provided with plastic cards for face to face transactions. Consumer certificates are an electronic representation of their payment card and are stored in a secure electronic wallet on their personal computer or on the issuer's secure server.

SET certificates safeguard transactions through a number of security measures. They are digitally signed and issued by financial institutions, prohibiting alteration by a third party and ensuring generation by an authorized party. In addition, the information they hold is encoded and cannot be seen or decoded by anyone except the entity that issued the certificate. If every participant in a transaction has a SET certificate, the process will be fully secure. However, even if only the merchant and its acquirer bank are SET-compliant, the transaction will still be more secure than one conducted using other payment protocols, including for example, Secure Socket Layer or SSL.

2. Certificate Authorities

Each payment brand has both a Certificate Authority that issues certificates to the payment card issuers and the merchant's acquirer bank, and a Certificate Authority for signing individual payment gateway certificates. Issuers are then able to issue certificates to their cardholders, and acquirers can issue certificates to their merchants. This 'hierarchy of trust' reflects the relationships that exist in traditional 'physical world' payment systems.

For instance, the root Certificate Authority—in this case SETCo—sits at the top of the hierarchy and is responsible for issuing digital certificates to the payment brands. By obtaining SET certificates from SETCo, the payment brands become Certificate Authorities and are entitled to issue SET certificates to their member banks. The member banks in turn become Certificate Authorities that can sign and issue SET certificates to their cardholders or merchants. They are responsible for ensuring the authenticity of the certificates and must confirm the identity of a certificate requester before issuing a certificate.

3. Cardholder Wallet and Encryption

To request and use digital certificates, consumers need an Internet connection and a browser, plus a SET enabled electronic wallet. The wallet is a software application, which is either held on a cardholder's computer or is managed on their behalf on the issuer's secure server. It stores key information required for the transaction such as the payment brand account number and expiration date and their SET certificate. Consumers can obtain an electronic wallet from a range of authorized parties, including their financial institution.

By encoding information before it is transmitted over the Internet, the SET-enabled wallet ensures that the payment information remains confidential as it transverses the Web. Payment information remains encrypted until received by the merchant's acquirer bank, where it is decrypted so that the transaction can be authorized by the cardholder's issuer bank. The information is then re-encrypted so that the cardholder and merchant can be notified of the transaction's successful completion.

4. Merchant SET Software Requirements

To become SET-compliant, merchants simply need to integrate a SET software component into their virtual storefront system. This SET software then facilitates the actual authorization and settlement process of the payment transaction. The SET module is software developed from the SET specifications.

5. Payment Gateways

As mentioned above, the payment gateway acts as the interface between a SET-compliant merchant and the merchant's bank (the acquirer). It performs three main functions, as follows:
1. Decrypts the SET-encoded message
2. Authenticates all participants in a transaction
3. Reformats the SET message into a format compliant with the merchant's point of sale system and forwards the payment authorization request into the payment network.

The SET Transaction Process

Once a consumer has selected items for purchase from an Internet retailer's website and has been presented with an order form, the SET transaction process begins as follows:
1. The cardholder (or account holder) selects the 'Payment with SET' option and then chooses their form of payment e.g. Visa, MasterCard etc.
2. The merchant 'wakes up' the cardholder's SET wallet, which sends a message to the merchant indicating which payment card the consumer is using.
3. An exchange takes place between the merchant and cardholder, authenticating each party and encrypting the payment information. This encrypted data is then forwarded to the merchant, which sends it, still encrypted, to the SET payment gateway.
4. The SET payment gateway authenticates all the parties in the transaction and forwards the authorization request into the payment network and processes the transaction with its normal authorization process.
5. If approved, the merchant ships the requested goods or provides the requested service and, in return, receives payment from its financial institution.

SUMMARY OF THE INVENTION

In accordance with the present invention, when an appropriate transaction message is received by a payment gateway, instead of requesting an authorization of the transaction through the payment network, the payment gateway, preferably after authentication, instead sends an authorization response back to the message originator to enable the message originator to use its existing payment system protocol for actual authorization.

More specifically, a method is provided for conducting a transaction of a certain amount over a communications network between parties to a transaction including a consumer with a payment account number (PAN) and a merchant computer, the number being issued by an issuer, and involving a payment system including a merchant's acquirer computer and an issuer computer associated with the issuer, the payment system typically being accessible through a payment gateway, the method comprising:

generating a first message authorization request and forwarding the request to the payment gateway; authenticating the parties by the gateway and returning to the merchant's computer an automatic authorization approval without first obtaining authorization from the issuer; based upon the authentication and the automatic authorization approval, generating a second authorization request for authorizing the transaction using the PAN; forwarding the request not to the payment gateway but to the merchant's acquirer; and authorizing or declining the second request at least based on the PAN and the amount of the transaction.

In accordance with a preferred embodiment of the invention, the first message authorization request is formatted in compliance with a first certain protocol and the second authorization request is a formatted in compliance with a second certain protocol. The first certain protocol is preferably the SET protocol and the second certain protocol when using the Internet for communication is preferably the SSL protocol, and the payment gateway is a preferably SET-compliant payment gateway.

Figure 1:
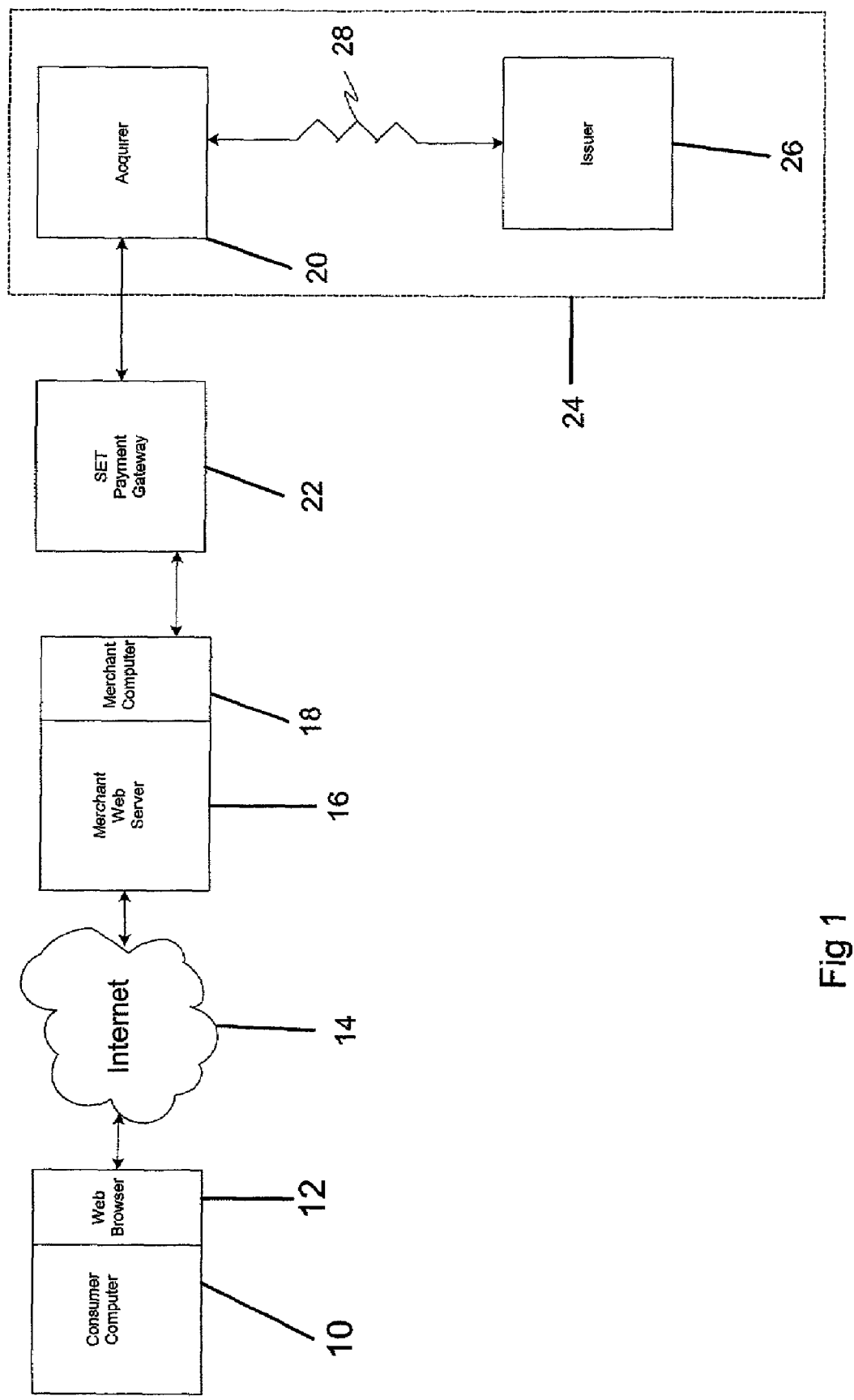
FIG. 1 is a block diagram of the processing components involved in the transaction method in accordance with the typical SET transaction.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with a preferred embodiment. It is intended that changes and modifications can be made to the described embodiment without departing from the true scope and spirit of the subject invention as defined by the appended claims.

DETAILED DESCRIPTION OF THE PREFERRED EMBODIMENT

A preferred embodiment of the present invention relates to the use of the SET protocol with or without optional extensions to accommodate a number of different authentication schemes.

Advantageously, the present invention includes a mechanism to incorporate:

1. SafeDebit™ PIN-based debit system data which passes an encrypted PIN block from a cardholder system to a back-end third party (see safedebit.com);
2. NACHA—The Electronic Payments Association system data—which passes a signed object created in the cardholder system, which is sent to the merchant, then to its acquirer, and ultimately to be checked by the back-end issuer (see nacha.org);
3. the use of Identrus™ private keys and associated public key certificates, included in software or alternatively imbedded in hardware chip cards (see identrus.com).

The cardholder SET system will support new SET extensions that will be recognized by the merchant system as "pass-through" data. This data will be forwarded to the merchants' acquirer using the SET protocol, incorporated herein by reference—see www.setco.org. It is assumed that someone of ordinary skill in the art is familiar with the SET specifications and the protocols set forth therein.

In the typical SET transactions, the payment processing phases can generally be described, in conjunction with FIG. 1, as follows:

In phase 1, the cardholder using consumer computer 10 browses for items. This may be accomplished in a variety of ways, such as: (1) using a browser 12 to view an on-line catalog over the Internet 14 on a merchant's World Wide Web page 16; (2) viewing a catalog supplied by the merchant on a CD-ROM; or (3) looking at a paper catalog.

In phase 2, the cardholder selects items to be purchased from a merchant 18. In phase 3, the cardholder is presented with an order form containing the list of items, their prices, and a total price including shipping, handling, and taxes. This order form may be delivered electronically from the merchant's server 16 or created on the cardholder's computer by electronic shopping software. Some on-line merchants may also support the ability for a cardholder to negotiate for the price of items (such as by presenting frequent shopper identification or information about a competitor's pricing).

In phase 4, the cardholder selects the means of payment. SET focuses on the case when a payment card is selected. In phase 5, the cardholder sends the merchant a completed order along with a means of payment. In SET, the order and the payment instructions are optionally in a preferred embodiment digitally signed by cardholders who possess certificates.

In phase 6, the merchant sends an authorization request to its financial institution 20 (acquirer) which operates either itself or through a designated third party a payment gateway 22 or device which processes merchant payment messages, including payment instructions from cardholders, and is the "gateway" into the acquirer and payment system or network 24. The acquirer 20 incorporates the authorization data into a request that is sent via the payment network 24 for processing by the financial institution 26 (issuer) that issued the payment card to the cardholder. The issuer 26 responds to the acquirer 20 via the payment network 24 including switch system 28 with an authorization response. The response includes an indication of whether the authorization request has been approved. The acquirer 20 responds to the merchant 18 with the outcome of the request processing. In phase 7, the merchant ships the goods or performs the services requested from the order. Lastly, in phase 8, the merchant requests payment from the issuer via the acquirer and payment network 24.

Figure 2:
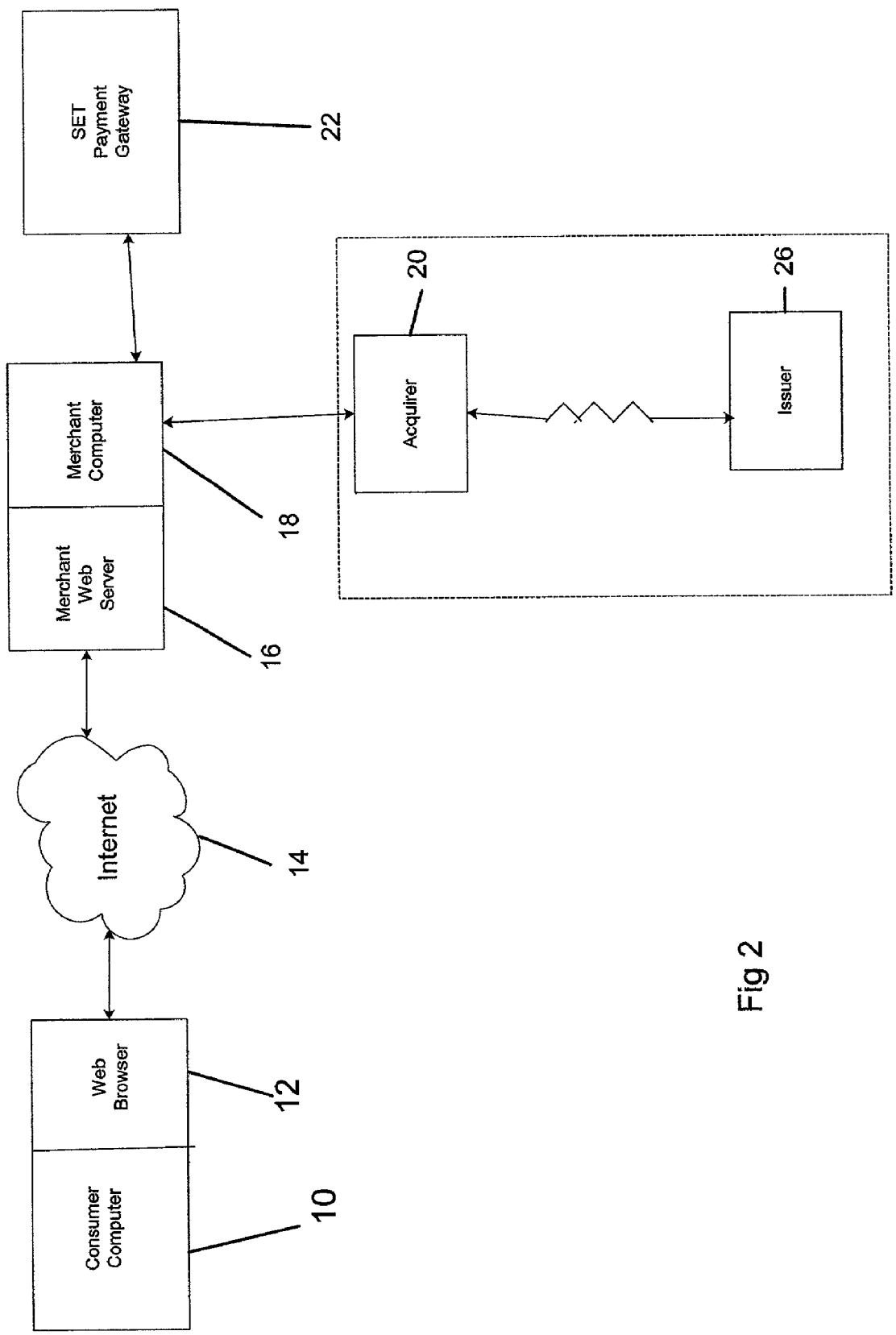
FIG. 2 is a block diagram of the processing components involved in the transaction method in accordance with one embodiment of the invention.

In accordance with the preferred embodiment of the present invention, an additional loop-back function is added at a SET payment gateway. As discussed above, SET payment gateways typically send their data onto the payment networks 24, such as the MasterCard payment networks. In this invention, however, the payment gateway does not communicate directly with a back-end payment system. Instead, as shown in FIG. 2, the SET payment gateway 22 verifies all the SET message digital signatures created by the cardholder and the merchant, decrypts all the message data into clear text form, which is a normal SET function, but never sends the data it has obtained from the SET message to the back-end payment systems. Instead, the SET payment gateway turns around and communicates immediately back to the merchant that sent the message and provides all the message data as if the issuing bank had indeed received and authorized the transaction. (The message data is preferably sent to the merchant in encrypted form that only the merchant can read.) In this way, the merchant system can obtain all the data imbedded in the SET message, which is then available for a subsequent authorization message, through the merchant's normal authorization protocol and methods, to the issuer.

A key concept of the invention is a reverse flow or redirection of data normally sent to a payment network but is instead immediately sent back to the originating party. This redirection and loop-back provides all the authentication services included in the SET technology without requiring that an Internet merchant change its business practices or modify its authorization and clearing systems to accommodate SET technology. In this way, all participants fully use SET technology, with digital certificates and digital signatures, thereby authenticating the identity of all Internet transacting parties, preferably including the cardholder, merchant, and acquiring bank. With the present invention, merchants derive the benefits of SET technology, but are not required to modify their current payment systems.

The present invention preferably uses the current SET generic cryptogram extension. There are created three new object identifiers ("OIDs") that differentiate each extension variation, one from the other:

1) The SafeDebit™ PIN based debit system data will pass an encrypted PIN block from a cardholder system, through the merchant using this SET extension variant, to the SET payment gateway which will immediately loop-back the PIN block to the merchant, within a normal formatted SET authorization response message. No authorization message will be generated by the SET payment gateway to MasterCard's network. Next, the merchant SET software will decrypt all message components into clear text form, and the merchant will proceed with normal SafeDebit™ type processing.

2) The NACHA system data will pass a signed object created in the cardholder system to the merchant using this SET extension variant. At the SET payment gateway, the NACHA data will be immediately looped-backed to the merchant in a normal formatted SET authorization response message. No authorization message will be generated by the SET payment gateway to MasterCard's network. Next, the merchant SET software will decrypt all message components into clear text form, and the merchant will proceed with normal NACHA system type processing.

3) The use of Identrus™ private keys and associated public key certificates, included in software or alternatively imbedded in hardware chip cards, to pass an Identrus™ signed message created in the cardholder system to the merchant using this SET extension variant. At the SET payment gateway, the Identrus™ data will be immediately looped-backed to the merchant in a normal formatted SET authorization response message. No authorization message will be generated by the SET payment gateway to MasterCard's network. Next, the merchant SET software will decrypt all message components into clear text form, and the merchant will proceed with normal Identrus™ system-type processing.

With the present invention, SET merchants no longer need to deploy any additional authorization and payment technology. They may use their current communication links and systems to initiate authorization and clearing functions. Advantageously, the SET loop-back feature of the present invention at the payment gateway provides the data that payment schemes require for merchants to obtain guaranteed funds for an electronic commerce transaction.

For example, MasterCard accepting merchants would in this invention preferably obtain the cardholder digital certificate serial number contained in the SET purchase requisition message. This is a critical piece of data required by the MasterCard processing systems for merchants to claim transaction payment guarantee. In addition, the merchant would also receive all normal data such as the cardholder's primary account number (PAN) and expiry date, in the clear, prior to the merchant initiating the true authorization request.

In accordance with the present invention, the loop-back to the merchant may include normal transaction data, such as primary account number and expiry date, and it may also include other payment-related data, such as the merchant certificate serial number and the cardholder certificate serial number.

With the present invention, when the payment gateway receives the SET extension discussed above, it immediately returns the application data back to the merchant. The cardholder receives authentication of the merchant. Under the present invention, the merchant preferably does not receive any data back until a bank-controlled payment gateway has agreed to loop-back the data to the merchant.

Advantageously, the present invention provides a cost effective solution for the travel industry and direct mail merchants who require the PAN up front so they can utilize their existing order processing, fulfillment, and authorization (batch) processes, while maintaining the integrity of the SET protocol.

Again, the main benefit of the present invention is to unlock the consumer's credit card number (at the SET payment gateway) and return it to the merchant securely, so it can use its existing acquirer relationship to process the transaction in its usual fashion. The acquirer or MasterCard may provide the SET gateway functionality.

Exemplary Process

The cardholder has a SET wallet, and the merchant is enabled with a SET merchant POS system (which may require some customization) to work with SET.

The electronic commerce shopping experience is, as always, outside of SET. When the cardholder wants to check-out and triggers the "buy button" at the merchant's site, the following sequence of events unfold (with reference to FIG. 2):

The merchant storefront web server 16 sends and/or posts a message to the merchant POS (MPOS) system.

The MPOS then generates a SET kick-off message, which is sent back to the storefront server.

The storefront server then sends this kick-off message to the cardholder's browser 12.

The cardholder's browser (which operates with the cardholder's SET wallet) launches the wallet.

The cardholder enters his or her password, selects the payment card he or she desires to use, and initiates the payment.

A SET message is sent to the merchant, who then creates it's own SET message and forwards it onto the SET Payment Gateway 22.

The SET Payment Gateway (SPG) decrypts the message and authenticates the parties.

Unlike in a traditional SET transaction, the messages from the merchant does not result in the SPG initiating an authorization request to the merchant acquirer (a so-called "live" authorization).

Rather than forwarding the message to the acquirer for authorization, the SPG 22 returns the message to the merchant 18 with an automatic authorization approval and with the PAN encrypted in the merchant's public key.

The merchant can now open the message to obtain the cardholder's PAN.

The merchant can then take the PAN and package up a message to its acquirer 20 (just as it would with an SSL-initiated payment transaction) and send this message through its normal processing system for authorization.

The merchant then receives an authorization or decline of the transaction from its acquirer (via the issuer 26) and sends an appropriate response to the cardholder.

The merchant has options when handling the cardholder communication. Typically, the merchant immediately issues a response to the cardholder advising the cardholder that the transaction is "in process" and that an email confirmation will follow shortly. Alternatively, the merchant may have the cardholder wait for an actual authorization.

While the merchant can process SET transactions in the above manner, it does not receive charge-back protection, unless it can map the SET data elements (plus certificate serial number) through to the acquirer, who must also process the data elements properly back to the issuer.

Although preferred embodiments of the invention have been disclosed for illustrative purposes, those skilled in the art will appreciate that many additions, modifications, and substitutions are possible without departing from the true scope and spirit of the invention as defined by the accompanying claims.

We claim:

1. A method for conducting a transaction of a certain amount over a communications network between parties to a transaction including a consumer with a payment account number (PAN) and a merchant computer, said number being issued by an issuer, and involving a payment system including a merchant's acquirer computer and an issuer computer associated with said issuer, said payment system being accessible through a payment gateway, said method comprising:
   generating a first message authorization request and forwarding said request to said payment gateway;
   authenticating said parties by said gateway and returning to said merchant's computer an automatic authorization approval without first obtaining authorization from said issuer;
   based upon said authentication and said automatic authorization approval, generating a second authorization request for authorizing said transaction using said PAN;
   forwarding said request not to said payment gateway but to said payment system; and
   authorizing or declining said second request at least based on said PAN and said amount of said transaction.

2. The method of claim 1 wherein said first message authorization request is formatted in compliance with a first certain protocol and said second authorization request is formatted by said merchant computer in compliance with a second certain protocol.

3. The method of claim 2 wherein said first certain protocol is a SET protocol and the second certain protocol is a SSL protocol; and wherein said payment gateway is a SET payment gateway.

4. A method for conducting a transaction over a communications network between a consumer with a payment account number (PAN) issued by an issuer and a merchant computer, said consumer having a consumer computer for conducting the transaction over the network with said merchant computer, and including a payment gateway for accessing a payment system, said payment system including an acquirer computer associated with said merchant and an issuer computer associated with said issuer, the method comprising:
   generating by said consumer's computer a message authorization request;
   packaging said message authorization request with a merchant's message authorization request;
   encrypting said merchant authorization request;
   forwarding said encrypted merchant's authorization request to said payment gateway;
   decrypting by said payment gateway said merchant authorization request and authenticating the consumer and the merchant;
   returning a message to said merchant's computer with an automatic authorization approval and said consumer's encrypted PAN without first obtaining authorization through said payment system;
   opening said returned message to obtain said PAN;
   forwarding a payment authorization request using said PAN to said payment system; and
   providing by said acquirer computer an authorization or decline of said payment authorization request.

5. The method of claim 4 wherein said payment system is not accessed through said payment gateway.

\* \* \* \* \*